United States Patent [19]
Shingaki et al.

[11] Patent Number: 4,946,724
[45] Date of Patent: Aug. 7, 1990

[54] VITREOUS FILM AND HEAT-MODE OPTICAL RECORDING MEDIUM USING SAME

[75] Inventors: Seiichi Shingaki, Hadano; Kazuyoshi Nagao, Yokohama; Yasuo Takahashi, Tokyo; Takashi Noma, Atsugi, all of Japan

[73] Assignee: Canon Kabushiki Kaisha, Tokyo, Japan

[21] Appl. No.: 290,699

[22] Filed: Dec. 27, 1988

[30] Foreign Application Priority Data

Dec. 28, 1987 [JP] Japan .................................. 62-334990
Dec. 9, 1988 [JP] Japan .................................. 63-311464

[51] Int. Cl.$^5$ ............................................... B32B 3/02
[52] U.S. Cl. ......................................... 428/64; 428/65; 428/209; 428/433; 428/457; 428/913; 369/284; 369/288; 346/76 L; 346/135.1; 430/945
[58] Field of Search .................... 428/64, 65, 209, 433, 428/457, 913; 369/284, 288; 346/76 L, 735.1; 430/945

[56] References Cited

U.S. PATENT DOCUMENTS

| | | | |
|---|---|---|---|
| 4,388,400 | 6/1983 | Tabei et al. | 430/945 |
| 4,414,273 | 11/1983 | Wada et al. | 428/457 |
| 4,529,991 | 7/1985 | Wada et al. | 346/762 |
| 4,580,146 | 4/1986 | Nakao et al. | 346/135.1 |

Primary Examiner—Patrick Ryan
Attorney, Agent, or Firm—Fitzpatrick, Cella, Harper & Scinto

[57] ABSTRACT

A vitreous film containing, e.g., 30–90 wt. % of Sn, 1–20 wt. % of P, 0.1–20 wt. % of Pb, 2–30 wt. % of O and 5–35 wt. % of F is formed by vapor deposition on a substrate such as glass, metal, plastic or ceramic. A light-absorbing substance can be incorporated in the vitreous film to provide a recording layer for a heat-mode optical recording medium capable of causing decoloration or formation of pits on irradiation with a laser beam.

6 Claims, No Drawings

VITREOUS FILM AND HEAT-MODE OPTICAL RECORDING MEDIUM USING SAME

FIELD OF THE INVENTION AND RELATED ART

The present invention relates to a vitreous film formed on a substrate of glass, metal, etc. The present invention further relates to a heat-mode optical recording medium.

There has been a well-known technique for forming a glass film on a substrate of various materials, such as glass, metal, plastic, and ceramic.

A first method is one using vacuum evaporation. A glass material used as the evaporation source may for example be well-known No. 8329 Glass of Schott Inc., which may be subjected to evaporation by the electron beam process to form a film for improving chemical durability and wear resistance of a substrate (Schott Inc's, pamphlet: Glass 8329 for evaporation). Further, instead of the electron beam process, there may also be frequently used the resistance heating process wherein an evaporation source placed on a boat of Mo, Ta, W, etc., is heated by current conduction to cause evaporation.

A second method used in place of evaporation may be one using the high-frequency sputtering process, wherein Ar gas is supplied with a high-frequency output and caused to impinge on a target to form a film on a substrate. A well-known example of the target material may be Corning 7059 (glass code). The 7059 glass may provide a sputtering film with a refractive index of 1.544 ($\lambda = 0.6328$ micron) so that it is possible to form a glass film waveguide by using a substrate of quartz, pyrex or soda glass.

However, glass materials as described above used conventionally as evaporation source or target are accompanied with the following defects.

(1) The glass softening temperature is high so that a large energy is required for evaporation (softening temperature: 960° C. for "8329", 844° C. for "7059"). In the case of evaporation by electron beam, for example, a high power beam and an increased capacity of pump are required in order to provide a large film forming speed. Further, in the case of the resistance heating process, a large current and voltage for increasing the heating temperature and similarly an increased capacity of pump are required. These tendencies are generally further pronounced for a higher softening temperature.

(2) Glass species capable of being formed into films have been restricted, so that no glass film having a high refractive index has been obtained. (Refractive index of a glass film: $n_d = 1.47$ for "8329", $n_{0.6328} = 1.544$ for "7059"). Schott "8329" and Corning "7059" comprise an major components $SiO_2$ and $B_2O_3$ which do not contribute to an increase in refractive index. Further, almost no glass materials other than the above two species of glass materials have been used for film formation, so that there is substantially no room for selection of the refractive index of a film.

SUMMARY OF THE INVENTION

A principal object of the present invention is to solve the above-mentioned problems of the prior art and provide a vitreous film capable of easy production and showing a high refractive index.

Another object of the present invention is to provide a heat-mode optical recording medium capable of easy production and capable of heat-mode recording at a low optical energy.

A further object of the present invention is to provide a heat-mode optical recording medium excellent in mechanical and chemical durability.

According to the present invention, there is provided a vitreous film formed on a substrate, containing Sn, P, Pb, O and F as principal elements.

According to another aspect of the present invention, a light-absorbing substance may further be incorporated in such a vitreous film to provide a heat-mode optical recording medium.

The vitreous film according to the present invention is composed of a glass material which can be readily formed into a film by vapor deposition inclusive of evaporation and sputtering. Further, the vitreous film thus formed has a high refractive index exceeding 1.65.

Incidentally, it has been well known that glasses of Pb—Sn—P—2O—F system have a low melting point and have been proposed to be used as a direct molding material for aspheric lenses (e.g., Physics and Chemistry of Glasses, Vol. 25, No. 6, December 1984). However, it has not been known that the evaporation or sputtering of a glass of this system provides an optical film having a relatively high refractive index and good chemical durability. Research has not been directed to the possibility of extensive availability and development of such a film. The present invention is based on a discovery that such a Pb—Sn—P—O—F system glass is a material suitable for providing a film having excellent optical characteristics including a high refractive index.

DETAILED DESCRIPTION OF THE INVENTION

The vitreous film according to the present invention may preferably have a thickness of 40 microns or below, particularly 10 microns or below. The vitreous film may preferably have a thickness of 100 Å or above.

The vitreous film may suitably contain principal components including 30–90 wt. % of Sn, 1–20 wt. % of P, 0.1–20 wt. % of Pb, 2–30 wt. % of O and 5–35 wt. % of F. The preferred F content may be 5–25 wt. %, and the preferred Sn content may be 50–80 wt. %. Further, it is suitable that the total content of the principal elements of Sn, P, Pb, O and F is 90 wt. % or more. In other words, other glass forming elements and inevitable impurities can be contained up to about 10 wt. % in total.

The substrate on which the vitreous film according to the present invention is formed may comprise glass, metal, plastic, ceramic or a composite material of these.

The vitreous film according to the present invention may be effectively used as not only for a glass waveguide and a surface protecting film but also a heat-mode optical recording medium. Herein, the term "heat-mode optical recording medium" means a medium which comprises a recording layer which, on irradiation with a light beam, absorbs the light beam to generate a heat and causes a thermal change by the heat at the irradiated part to provide a record. The thermal change may for example be formation of a pit due to local melting or evaporation of the recording layer or local decoloration of the recording layer.

When the vitreous film according to the present invention is used as a heat-mode optical recording medium, a light-absorbing substance may suitably be contained in the vitreous film.

Effective examples of the light-absorbing substance may suitably include organic colorants such as organic dyes and organic pigments showing an absorption in the infrared wavelength region.

The light-absorbing substance may suitably be contained in the vitreous film in a proportion of 1-80 wt. % with respect to 100 wt. parts of the glassforming components, preferably 1-50 wt. parts per 100 wt. parts of the glass-forming elements in view of desirable mechanical strength of the vitreous film.

The heat-mode optical recording medium thus formed according to the present invention, has advantages as follows.

The vitreous film can be formed at a relatively low temperature so that the light-absorptive recording layer can be formed simultaneously, thus providing an optical recording medium having a sufficiently good chemical durability at a time. The vitreous film has a refractive index which is sufficiently high relative to that of an ordinary substrate material, so that multiple reflection may readily occur between the substrate and the film at the time of recording. As a result, a higher recording speed may be attained.

Hereinbelow, the present invention will be explained more specifically with reference to Examples.

EXAMPLE 1

About 300 g of starting materials ($SnF_2$, $PbF_2$ and $P_2O_5$) formulated to provide a composition (a) shown in Table 1 appearing hereinafter were mixed with about 10 wt. % of $NH_4F \cdot HF$ for atmospheric conditioning to prepare a batch. The thus-prepared 300 mg of batch was placed in an about 300 ml-crucible of silica glass and melted for 1.5 hours in an electric furnace kept at 460° C. The molten batch was then cast onto a water-cooled stainless steel vat to be formed into thin transparent glass. The cast glass, on chemical analysis, showed a composition (b) shown in Table 1. Further, the cast glass gave a softening temperature of 105° C. as a result of measurement by TMA (thermal mechanical analysis).

A part of the thus-obtained glass composition (b) was subjected to a vacuum evaporation test by the resistance heating process. More specifically, about 0.5 g of the glass composition (b) was weighed into a box-shaped heating boat of Ta and evaporated onto a 1 mm thick 1 inch-square quartz glass plate. The evaporation was conducted under three conditions including No. 1 of a large film-formation speed of about 50 Å/sec, No.2 of a medium film-formation speed of about 15 Å/sec, and No. 3 of a relatively small film-formation speed of about 2 Å/sec by adjusting voltages applied to the heating boat. The evaporation time was 5 minutes in each case. As a result, the evaporation film was formed in a thickness of about 1.4 micron under the evaporation condition No. 1 and thicknesses of about 0.4 micron and about 0.5 micron under the conditions of Nos. 2 and 3, respectively. (The resultant evaporation films were respectively referred to as evaporation films Nos. 1, 2 and 3.) The thus-obtained evaporation film 1, 2 and 3 were all transparent, showed tints of gray brown, brown and pale yellow, respectively, and gave refractive indices ($n_d$) of 1.83, 1.81 and 1.79, respectively.

On chemical analysis, the evaporation films showed compositions respectively shown in Table 2. Table 2 shows that the film composition changed depending on the film-forming conditions, but all the components in the evaporation sources were contained in the evaporation films in addition to an impurity Si.

Further, X-ray analysis of the evaporation films 1, 2 and 3 showed that the evaporation films 1 and 2 contained micro-crystals of $Sn_2P_2O_7$ and $PbH_2P_2O_5$ but no metal phase of Sn or Pb was detected. The evaporation film 3 was too thin so that the presence or absence of crystals could not be identified.

From the above results showing that the evaporation films 1 and 2 contained a large amount of F but no fluoride crystals was present, it is supposed that F was captured in glass structure.

TABLE 1

| | Glass-forming components (wt. %) | | | | | |
|---|---|---|---|---|---|---|
| | Sn | Pb | P | O | F | other |
| (a) | 55 | 10 | 6.5 | 8.5 | 20 | |
| (b) | 59.5 | 10.8 | 7.0 | 8.1 | 11.2 | Si 3.1 |

TABLE 2

| Evaporation film | Film-forming components (wt. %) | | | | | |
|---|---|---|---|---|---|---|
| | Sn | Pb | P | O | F | other |
| No. 1 | 63.1 | 11.4 | 3.5 | 6.4 | 15.4 | 0.2 |
| No. 2 | 62.0 | 5.3 | 5.7 | 12.1 | 14.2 | 0.7 |
| No. 3 | 60.4 | 0.4 | 5.9 | 24.5 | 8.5 | 0.3 |

EXAMPLE 2

Evaporation film 1 prepared in Example 1 was irradiated with an electron beam from an electron beam microanalyzer under the conditions of an acceleration voltage of 15 KV, a sample current of 0.02 $\mu A$ and a focused electron beam diameter of about 2 microns. On irradiation for 2 seconds, the evaporation film was readily deformed to result in a pit having a diameter of about 2 microns.

EXAMPLE 3

The 1 inch-square substrates coated with evaporation films 1, 2 and 3 were respectively left standing for 1 week in an environment of 50° C. and 98 %-relative humidity, whereby no corrosion on film surfaces was observed and the weight loss was respectively below 0.01 %, i.e., within a measurement error.

EXAMPLE 4

Two source evaporation was effected by using a part of the glass composition (b) prepared in Example 1 and copper phthalocyanine as a light-absorbing substance of an organic colorant by the resistance heating process. The evaporation was effected on a 1×2.5 inch, 1 mm-thick transparent substrate of PMMA (polymethyl methacrylate), and two box-shaped Ta heating boats were used. On one Ta-boat (evaporation source 1), 0.5 g-weighed sample of the glass composition (b) was placed, and 0.2 g of copper phthalocyanine was placed on the other Ta-boat (evaporation source 2). Then, the system was evacuated to a vacuum of about $5 \times 10^{-5}$ Torr when the evaporation was started. Voltages applied to the boats of the both evaporation sources 1 and 2 were controlled to provide a film-formation speed of about 3 Å/sec, whereby an about 0.1 micron-thick blue transparent evaporation film was obtained after 5 minutes of the two source evaporation.

Then, the evaporation film was subjected to a recording experiment using a laser beam, wherein a 30 mW-power LD (light-emitting diode) having an emission peak at 830 nm and the luminous flux was focused to a diameter of 1.0 micron (providing a measured output on the film of 6 mW as a result of a preliminary measurement). The blue transparent film prepared above was irradiated by the laser beam at three parts with an irradiation time of 0.5 μsec for each part. As a result of observation through a microscope of the laser-irradiated parts, each part was decolorized into transparency and resulted in a round pit. The diameters of the pits were respectively 1.1 micron, 1.2 micron and 1.1 micron, thus showing that pits of diameters substantially equal to that of the laser beam and with a reduced film thickness of about 0.03 micron each were formed.

EXAMPLE 5

Two source evaporation was repeated in the same manner as in Example 4 except that dithiolnickel complex and naphthoquinone dye were respectively used as a light-absorbing substance, whereby the former provided a green transparent evaporation film while the latter provided a brown transparent evaporation film respectively in a thickness of about 0.1 micron.

These evaporation films were subjected to a recording experiment using a He—Ne laser (power: 5 mW) of 633 nm in wavelength as a light source. The luminous flux was focused to a diameter of 1.0 micron on the evaporation films to irradiate 3 parts each of the films with an irradiation time of 10 μsec for each part. As a result of microscopic observation of the laser-irradiated parts, decoloration and pit formation were observed at each part. The pit diameters were all contained in the range of 1.1-1.3 micron, and the resultant minimum film thickness at the pits was about 0.03 micron.

EXAMPLE 6

0.5 g of the glass composition prepared in Example 1 and 0.4 g of copper phthalocyanine were weighed and mixed with each other after pulverizing the glass to the order of 100 mesh. The resultant powder mixture sample was placed on a Ta boat and used in a single source evaporation test.

The evaporation was effected under a filmforming speed of about 4 Åsec by controlling the applied voltage, whereby an about 0.11 micron-thick blue transparent evaporation film was obtained after 4 minutes of evaporation.

A recording test was effected by using the evaporation film otherwise in the same manner as in Example 1. As a result of microscopic observation, formation of colorless transparent pits of 1.1 - 1.2 micron in diameter and a reduced minimum thickness of about 0.03 micron was observed.

EXAMPLE 7

The substrates coated with the evaporation films and subjected to pit formation in Examples 4, 5 and 6 were respectively left standing in an environment of 50° C. and 98 %-relative humidity, whereby no corrosion was observed on any of the films and the weight loss was respectively below 0.01 %, i.e., within a measurement error.

What is claimed is:

1. A vitreous film formed on a substrate, containing 30-90 wt. % of Sn, 1-20 wt. % of P, 0.1-20 wt. % of Pb, 2-30 wt. % of 0 and 5 -35 % of F as principal elements.

2. A vitreous film according to claim 1, which contains 5-25 wt. % of F.

3. A vitreous film according to claim 1, which has a refractive index of above 1.65.

4. A vitreous film according to claim 1, which has been formed by vapor deposition.

5. A heat-mode optical recording medium, comprising a recording layer in the form of a vitreous film comprising 30-90 wt. % of Sn, 1-20 wt. % of P, 0.1-20 wt. % of Pb, 2-30 wt. % of 0 and 5-35 wt. % of F as principal glass forming elements and 1-80 wt. parts of a light-absorbing substance per 100 wt. parts of the total glass-forming elements.

6. An optical recording medium according to claim 5, wherein said recording layer has been formed by vapor deposition.

* * * * *

UNITED STATES PATENT AND TRADEMARK OFFICE
CERTIFICATE OF CORRECTION

PATENT NO. : 4,946,724

DATED : August 7, 1990

INVENTOR(S) : SEIICHI SHINGAKI ET AL.

It is certified that error appears in the above-identified patent and that said Letters Patent is hereby corrected as shown below:

AT [57] ABSTRACT

Line 2, "0" should read --O--.

COLUMN 1

Line 55, "an" should read --as--.

COLUMN 2

Line 19, "Pb-Sn-P-2O-F system" should read --Pb-Sn-P-O-F system--.

COLUMN 3

Line 7, "glassforming" should read --glass-forming--.
    Line 12, "invention," should read --invention--.
    Line 46, "1 mm thick" should read --1 mm-thick--.

UNITED STATES PATENT AND TRADEMARK OFFICE
CERTIFICATE OF CORRECTION

PATENT NO. : 4,946,724

DATED : August 7, 1990

INVENTOR(S) : SEIICHI SHINGAKI ET AL.

Page 2 of 2

It is certified that error appears in the above-identified patent and that said Letters Patent is hereby corrected as shown below:

COLUMN 6

Line 1, "filmforming" should read --film-forming--.
Line 24, "O and 5-35%" should read --O and 5-35 wt. %--.
Line 34, "0" should read --O--.
Line 35, "glass forming" should read --glass-forming--.

Signed and Sealed this

Fifteenth Day of September, 1992

Attest:

DOUGLAS B. COMER

Attesting Officer

Acting Commissioner of Patents and Trademarks